(12) United States Patent
Diao et al.

(10) Patent No.: US 8,122,450 B2
(45) Date of Patent: Feb. 21, 2012

(54) METHOD AND APPARATUS FOR DISTRIBUTING MEMORY IN A DATA PROCESSING SYSTEM

(75) Inventors: Yixin Diao, White Plains, NY (US); James Liam Finnie, Toronto (CA); Christian Marcelo Garcia-Arellano, Richmond Hill (CA); Sam Sampson Lightstone, Toronto (CA); Lan Pham, Markham (CA); Adam J. Storm, Toronto (CA); Maheswaran Surendra, Croton-on-Hudson, NY (US); Gary Valentin, Tel-Aviv (IL); Daniele Costante Zilio, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 1330 days.

(21) Appl. No.: 11/278,134

(22) Filed: Mar. 30, 2006

(65) Prior Publication Data
US 2007/0233991 A1    Oct. 4, 2007

(51) Int. Cl.
    *G06F 9/46*     (2006.01)
    *G06F 13/00*    (2006.01)
(52) U.S. Cl. .................. 718/104; 718/105; 711/170
(58) Field of Classification Search .......... 718/104; 711/170; 710/56
    See application file for complete search history.

(56) References Cited

U.S. PATENT DOCUMENTS

| | | | |
|---|---|---|---|
| 5,093,912 A * | 3/1992 | Dong et al. | 718/104 |
| 5,640,604 A | 6/1997 | Hirano | |
| 5,784,698 A * | 7/1998 | Brady et al. | 711/171 |
| 5,784,702 A | 7/1998 | Greenstein et al. | |
| 6,260,068 B1 | 7/2001 | Zalewski et al. | |
| 6,366,945 B1 | 4/2002 | Fong et al. | |
| 6,738,866 B2 * | 5/2004 | Ting | 711/133 |
| 6,742,100 B1 | 5/2004 | Schnee et al. | |
| 6,763,519 B1 | 7/2004 | McColl et al. | |
| 6,851,030 B2 | 2/2005 | Tremaine | |
| 6,925,546 B2 | 8/2005 | Krejsa | |
| 6,961,835 B2 * | 11/2005 | Lightstone et al. | 711/171 |
| 7,085,837 B2 * | 8/2006 | Kimbrel et al. | 709/226 |
| 7,433,856 B2 * | 10/2008 | Wu et al. | 706/47 |
| 2003/0056076 A1 | 3/2003 | Cook et al. | |
| 2003/0065688 A1 | 4/2003 | Dageville et al. | |
| 2003/0196062 A1 | 10/2003 | Valentin et al. | |
| 2004/0073763 A1 | 4/2004 | Dageville et al. | |
| 2004/0078541 A1 | 4/2004 | Lightstone et al. | |

(Continued)

OTHER PUBLICATIONS

Baugher, M. et al., "Buffer System APIs and Implementation for Quality of Service Communications Connections," Document No. AAA93A061965, TDB vol. 26, No. 8, 3 pgs.

Benayon, J.W., "Transparent Pooling in User Controlled Heaps," Document No. AAA96A060910, TDB vol. 39, No. 8, 2 pgs.

Cox, D. et al., "Sharing Memory Resources Without Requiring DosGiveSeg," Document No. AAA92A061177, TDB, No. 12, 1 pg.

(Continued)

*Primary Examiner* — Emerson Puente
*Assistant Examiner* — Adam Lee
(74) *Attorney, Agent, or Firm* — Terry J. Carroll; Edell, Shapiro & Finnan, LLC

(57) ABSTRACT

Methods and systems are provided for tuning memory allocated among a plurality of applications in a data processing system. In one implementation, the method includes generating memory benefit data for the plurality of applications, comparing the generated memory benefit data associated with each of the plurality of applications, and dynamically reallocating memory from one or more of the plurality of applications to one or more other of the plurality of applications based on the comparison. A method and system is also provided for tuning memory allocated among a plurality of individual memory consumers for a given application.

45 Claims, 4 Drawing Sheets

U.S. PATENT DOCUMENTS

2004/0210734 A1 10/2004 Abbey
2004/0230974 A1 11/2004 Hamilton, II et al.
2004/0250250 A1 12/2004 Hamilton, II et al.
2005/0091654 A1* 4/2005 Lection et al. ............... 718/100
2005/0268063 A1* 12/2005 Diao et al. .................... 711/170

OTHER PUBLICATIONS

Cox, D. et al., "Sharing Memory Resources Across Application in OS/2," Document No. AAA92A061585, TDB, No. 1a, 1 pg.

* cited by examiner

METHOD AND APPARATUS FOR DISTRIBUTING MEMORY IN A DATA PROCESSING SYSTEM

FIELD OF THE INVENTION

The present invention relates generally to data processing, and more particularly to methods for distributing memory in a data processing system.

BACKGROUND OF THE INVENTION

Data processing systems run a variety of different applications. Applications are computer programs (typically but not always in software form) that utilize a data processing system's resources, including its memory and processing capacity, to produce useful output. There are a wide variety of such applications, and one particular example of such an application is a database. Databases are computerized information storage and retrieval systems. There are many different types of databases. One particular type of database, for example, is a relational database that includes a relational database management system (RDBMS). A relational database management system (RDBMS) is a database management system (DBMS) which uses relational techniques for storing and retrieving data.

In a data processing system (e.g., a computer system, a network of computer systems, and the like) including multiple databases, each database is typically allocated memory space to perform database functions. For example, each database can allocate memory for buffer pools, shared and/or private sort space, database row or table locks, package cache, and so on. In a conventional data processing system including multiple databases, each database is typically unaware of the memory usage of the other databases (e.g., other databases on a same physical machine or other databases that are constrained to share the same (limited) pool of physical memory) in the data processing system. Consequently, in a conventional data processing system in which a database manager (e.g., a database management system (DBMS)) may be able to modify database memory usage for a corresponding database, a "greedy" database can consume most of the memory available in the database system, while another database in the data processing system or in another data processing system running on the same physical machine (which may have a greater need for additional memory usage) could end up being "starved" for memory.

BRIEF SUMMARY OF THE INVENTION

In one aspect, the present invention is directed to a method for tuning memory allocated among a plurality of applications running on a data processing system. The method comprises the steps of generating memory benefit data for the plurality of applications, comparing the generated memory benefit data associated with each of the plurality of applications, and dynamically reallocating memory from one or more of the plurality of applications to one or more other of the plurality of applications based on the comparison. In one embodiment, the memory benefit data represents time saved that a given application would achieve if the application were allocated additional memory, and in a particular embodiment, the memory benefit data is represented as time saved per unit of memory. The time saved may be one of system time saved, program execution time saved, response time saved, or disk time saved.

In one embodiment of the method, the step of generating memory benefit data for the plurality of applications includes, for each application, generating a first statistic that indicates how much benefit the application would gain from obtaining additional memory, and generating a second statistic representing a cost that would be incurred if the application were forced to give up memory. In a particular embodiment, the step of comparing the generated memory benefit data associated with each of the plurality of applications includes storing, in a shared memory, a single record including the overall benefit for an application having a highest benefit, after which the respective benefit data for each application would be compared with the benefit data stored in the shared memory.

Preferably, the step of dynamically reallocating memory from one or more of the plurality of applications to one or more other of the plurality of applications includes distributing memory from a least needy application to a most needy application. In a particular embodiment, the most needy application acquires additional memory substantially according to the following equation:

$$\text{MIN}((\text{curfree}-\text{minfree})*w, \text{application\_memory}*x),$$

and the least needy application frees up memory substantially according to the following equation:

$$\text{MIN}((\text{maxfree}-\text{minfree})*y, \text{application\_memory}*z)$$

In the equations above, application_memory represents the current amount of memory being used by the most needy application, maxfree represents a target maximum amount of free physical RAM for the data processing system) minfree represents a target minimum amount of free physical RAM for the data processing system, curfree represents the current amount of free physical RAM in the data processing system, w and y lie in the range ($0.0 < w, y < -1.0$), and x and z are positive ($0.0 < x, z$).

The method provides for optional specification of a minimum memory allocation for one or more of the plurality of applications, in which case dynamically reallocating memory from one or more of the plurality of applications to one or more other of the plurality of applications would omit reallocation of memory away from those applications that meet the minimum memory allocation.

The applications to which the method of the present invention may be applied include database applications, word processing applications, spreadsheet applications, e-mail applications, messaging applications, computer-assisted design applications, image processing applications, internet applications, telecommunication applications, video game applications, security applications, anti-virus applications, audio media applications, video media applications, document management applications, file management applications, mathematical processing applications, scheduling applications, and operating systems used to coordinate the sharing of resources among other applications.

In another aspect, the present invention is directed to a method for tuning memory allocated among a plurality of individual memory consumers for an application. The method comprises a step of generating memory benefit data for each of the plurality of individual memory consumers, which includes generating a first statistic representing a benefit the individual memory consumer would gain from obtaining additional memory and generating a second statistic representing a cost that would be incurred if the individual memory consumer were forced to give up memory. The method further includes steps of comparing the generated memory benefit data associated with each of the plurality of individual memory consumers, and dynamically reallocating memory from one or more of the plurality of individual memory consumers to one or more other of the plurality of individual memory consumers based on the comparison.

In a particular embodiment, the step of comparing the generated memory benefit data associated with each of the plurality of individual memory consumers includes storing, in a shared memory, a single record including the overall benefit for an individual memory consumer having the highest benefit, and comparing, the respective benefit data for each individual memory consumer with the benefit data stored in the shared memory. Preferably, the step of reallocating memory from one or more of the plurality of individual memory consumers to one or more other of the plurality of individual memory consumers includes distributing memory from a least needy individual memory consumer to a most needy individual memory consumer.

The method provides for optional specification of a minimum memory allocation for one or more of the plurality of individual memory consumers, in which case the step of dynamically reallocating memory form one or more of the plurality of individual memory consumers to one or more other of the plurality of individual memory consumers would omit reallocation of memory away from those individual memory consumers that meet the minimum memory allocation.

In one particular embodiment, the application comprises a database application, and each individual memory consumer comprises one of a memory for a buffer pool, a memory for a shared sort space, a memory for a private sort space, a memory for a database row lock, a memory for a table lock, or a memory for a package cache.

The present invention is also directed to computer program products tangibly stored on computer-readable media for implementing the above methods, and to data processing systems configured to carry out the methods.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

Figure 1:
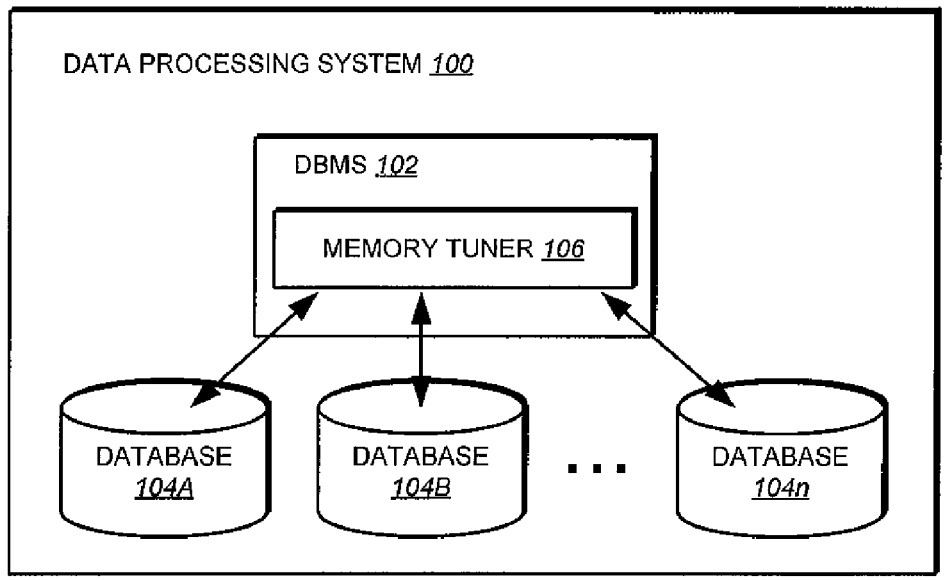
FIG. 1 is a block diagram of a data processing system including a memory tuner operable to compare a relative need for memory between multiple databases in accordance with one implementation of the invention.

FIG. 1 illustrates a data processing system 100 in accordance with one implementation of the invention. Data processing system 100 can be any type of system including, for example, a workstation, a desktop computer, a laptop computer, a personal digital assistant (PDA), a cell phone, a network, and so on. In one implementation, data processing system 100 includes a database management system (DBMS) 102 and a plurality of databases 104A-104n. Although three databases are shown in FIG. 1 by way of example, data processing system 100 can contain a different number of databases. Similarly, although only a single DBMS 102 is shown, data processing system 100 may contain one or more than one DBMS. In one implementation, each database management system (DBMS) 102 generates memory benefit data corresponding to each database 104A-104n. In one implementation, database management system (DBMS) 102 includes a memory tuner 106 operable to compare generated memory benefit data corresponding to each database 104A-104n, and dynamically reallocate memory from one or more of each database 104A-104n to a different one or more of databases 104A-104n in order to more efficiently distribute memory across databases 104A-104n. In one implementation, the benefit data is calculated substantially the same way for each database so that useful comparisons can be made. Thus, data processing system 100 can compare benefit data between multiple databases to more appropriately distribute memory among the multiple databases.

In general, a database is an organized collection of data, for example, stored on a data processing system. In general, a larger database may include a number of sub-databases, and for the purposes considered herein, each of the sub-databases can be considered to be a database. Typically, for a given database, there is a structural description of the type of data held in that database. This description is known as a schema. The schema describes the data (or objects) that are represented in the database, and the relationships among them. There are a number of different ways of organizing a schema, that is, of modeling the database structure. The model in most common use today is the relational model, which represents all information in the form of multiple related tables each consisting of rows and columns. The relational model represents relationships by the use of values common to more than one table. Other models such as the hierarchical model and the network model use a more explicit representation of relationships.

Figure 2:
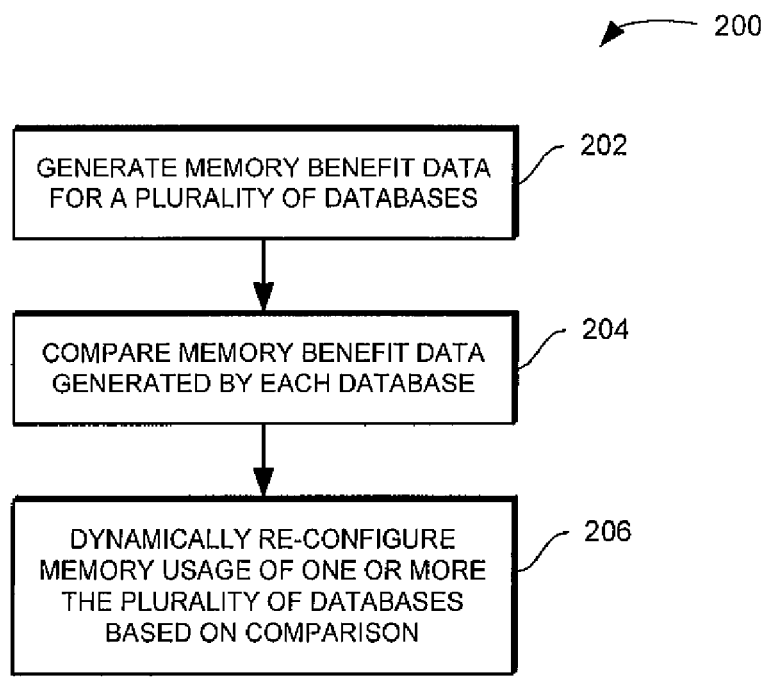
FIG. 2 illustrates a method for dynamically reallocating memory among multiple databases in accordance with one implementation of the invention.

FIG. 2 illustrates a method 200 for dynamically reallocating memory among multiple databases in a data processing system (e.g., data processing system 100) in accordance with one implementation of the invention. In one implementation, the databases are on the same physical machine and/or are constrained to share the same (limited) pool of physical memory. Memory benefit data is generated for each database (e.g., databases 104A-104n) (step 202). The memory benefit data can represent the (overall) benefit that a given database would achieve if memory usage of the database were increased—i.e., if the database were allowed to consume more memory. In one implementation, the memory benefit data is represented as system time saved (or program execution time saved, response time saved, disk time saved, or the like) per unit of memory. The overall benefit that a given database would achieve can be determined by calculating the individual benefit for each individual memory consumer in the given database, for example, the memory for buffer pools, memory for shared and/or private sort space, memory for database row or table locks, memory for package cache, and so on.

Techniques for calculating the individual benefit for each individual memory consumer (e.g., buffer pools) in the given database such as those described in U.S. Pat. No. 6,961,835, entitled—System and Method for Autonomically Reallocating Memory Among Buffer Pools—assigned to the assignee of the present invention, and incorporated by reference herein, can be used. For example, in one technique, a simulated buffer pool extension (SBPX) can be created for each buffer pool in a set of buffer pools. Data victimized from a buffer pool is represented in the associated SBPX. Requests for data that is not resident in a buffer pool but is represented in the associated SBPX are tallied. Periodically, an expected efficiency benefit of increasing the capacity of each buffer pool is determined from the tallies. Memory is reallocated from the buffer pool with the lowest expected efficiency benefit having remaining reallocatable memory to the buffer pool with the highest expected efficiency benefit having remaining reallocatable memory, until either one or both of the buffer pools exhausts its reallocatable memory. A buffer pool can exhaust its reallocatable memory by giving up or receiving a pre-determined maximum limit of memory.

For example, at the beginning of each interval a determination is made as to how much memory each buffer pool is permitted to give up and how much the buffer pool is allowed to receive (or gain). Thus, if a given buffer pool realizes little benefit and is, therefore, asked to give up some of its memory, the given buffer pool will do so until the buffer pool gives up its predetermined limit. In one implementation, the pre-defined limit of memory that a buffer pool can give up (within an interval) is 20% of the total memory allocated to the buffer pool. Accordingly, in a given interval, each buffer pool is only allowed to give up a maximum of 20% of the memory allocated to the buffer pool. Once a memory buffer has given up 20% of its memory, then that buffer has exhausted its reallocatable memory. This process is repeated until all reallocatable memory has been reallocated, until only one buffer pool with reallocatable memory remains, or until all buffer pools with remaining reallocatable memory have substantially the same expected efficiency benefit. In addition, in one implementation, a technique for determining the individual benefit for one or more memory consumers in a database as described in greater detail below in connection with FIG. 5 can be used.

In general, once all the individual benefits for one or more memory consumers in a single database are calculated, the overall benefit for that database can be calculated in a number of ways, including: 1) the average of each of the individual consumer benefits; 2) the benefit from the consumer having the greatest need for more memory; and 3) a weighted average of all the individual consumer benefits. Other suitable calculations may also be used.

The memory benefit data from each database is compared to the memory benefit data for the other one or more databases (step 204). In one implementation, a memory tuner (e.g., memory tuner 106) compares the memory benefit data generated for each database in the data processing system. Memory tuner 106 can be logic implemented in software, hardware, or a combination of software and hardware. Memory tuner 106 then dynamically re-configures the memory usage of some or all of the databases based on the comparison of the generated memory benefit data (step 206). In one implementation, the most needy database, in terms of memory usage, is allocated more memory (e.g., free physical random access memory (RAM)) if such memory is available from an operating system associated with the data processing system, while other less needy databases in the data processing system free up (or give up) memory to the operating system.

Figure 3:
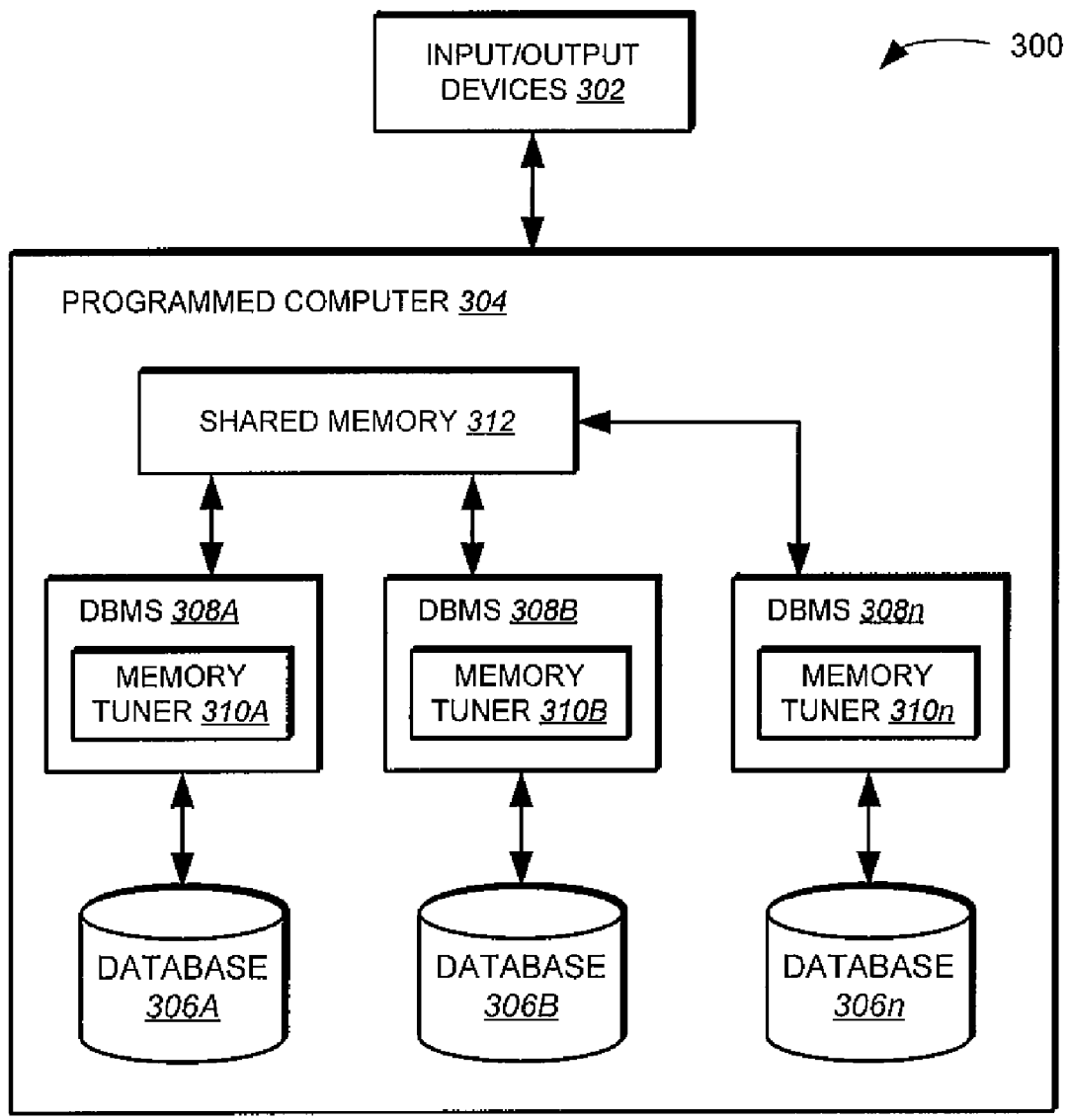
FIG. 3 is a block diagram of another data processing system in accordance with one implementation of the invention.

FIG. 3 illustrates a data processing system 300 in accordance with one implementation of the invention. Data processing system 300 includes input and output devices 302, a programmed computer 304, and multiple databases 306A-306n. Although three databases are shown in FIG. 3 by way of example, data processing system 300 can contain a different number of databases. Input and output devices 302 can include devices such as a printer, a keyboard, a mouse, a digitizing pen, a display, a printer, and the like. Programmed computer 304 can be any type of computer system, including for example, a workstation, a desktop computer, a laptop computer, a personal digital assistant (PDA), a cell phone, a network computer, and so on. Databases 306A-306n can be relational databases including one or more tables (not shown) for storing data. In one implementation, databases 306A-306n are constrained to share the same (limited) pool of physical memory. However, the memory distribution portion of this invention (i.e., distributing a given amount of database memory amongst the different memory consumers in a database (e.g., buffer pools, sort, and so on)) is still valid when there are not multiple databases or the databases are not constrained to share the same memory.

Running on programmed computer 304 (in one implementation) is a plurality of database management systems (DBMS) 308A-308n, in which each database management system (DBMS) 308A-308n manages a corresponding database 306A-306n. Each management system (DBMS) 308A-308n further respectively includes a memory tuner 310A-310n that is operable to dynamically re-configure memory allocated to a corresponding database based on memory benefit data as described in greater detail below. In one implementation, programmed computer 304 further includes a shared memory 312 for use in comparing memory benefit data among databases 306A-306n as discussed in greater detail below.

Figure 4:
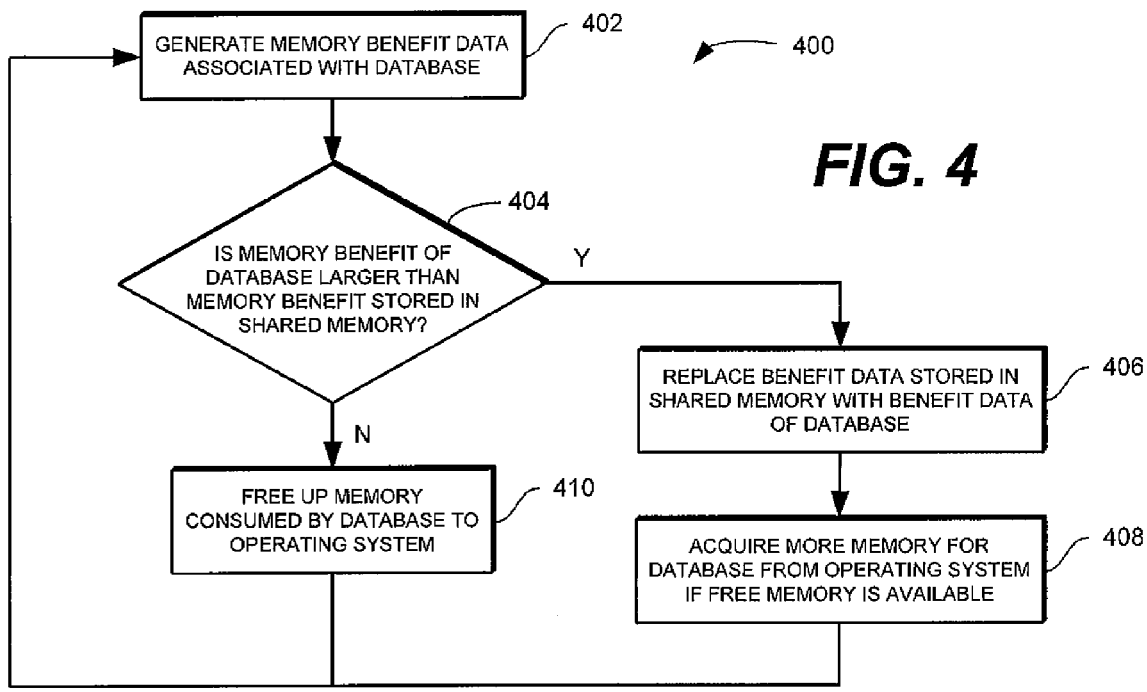
FIG. 4 illustrates a method for dynamically reallocating memory among databases in the data processing system of FIG. 3 in accordance with one implementation of the invention.

FIG. 4 illustrates a method 400 for dynamically re-configuring memory usage of databases (e.g., databases 306A-306n) in a data processing system (e.g., data processing system 300) in accordance with one implementation of the invention. Memory benefit data associated with each database is generated (step 402). As discussed above, the overall benefit for a given database can be calculated as 1) the average of each of the individual consumer benefits; 2) the benefit from the consumer having the greatest need for more memory; 3) a weighted average of all the individual consumer benefits; or any other suitable calculation.

As soon as the overall database memory benefit for a given database is calculated, the memory benefit data for the database is compared against the overall memory benefit data generated from other databases in the data processing system (step 404). In one implementation, once a given database has had calculated its corresponding memory benefit data, the database communicates the memory benefit data with other databases in the data processing system through the use of a shared memory (e.g., shared memory 312). In one implementation, the benefit data is stored (e.g., on disk) so that the benefit data can be later accessed by a given database. One particular way that benefit data can be compared is for the shared memory to contain a single record including the overall benefit for the database having the highest benefit, and if that benefit record does not exist, the first database to look for the benefit data will record that database's overall benefit data in the shared memory. Accordingly, each database can compare their respective benefit data with the benefit data of the neediest database on the system. If the benefit for a given database is larger than the recorded benefit in the shared memory, then the given database will replace the benefit data recorded in shared memory with its own benefit data (step 406), and that database then knows that it has the highest relative need for memory in the data processing system. Other databases in the data processing system will see that their overall benefit is lower than the benefit recorded in the shared memory record and so these databases, therefore, have a lower relative need for memory within the data processing system.

To ensure that stale values are not retained in the shared memory benefit record leading to an non-optimal distribution of memory among databases, in one implementation, the benefit record contains a unique descriptor for the database that recorded the benefit data (in one implementation, the unique descriptor could be a character string containing the database name along with any other data required to uniquely identify the database on the machine), and an expiry time or expiry date for the benefit record. If a database querying the benefit data sees a benefit record where the unique descriptor matches its own unique descriptor, and the new overall benefit for that database has changed, then the shared memory benefit record will be updated with the new benefit data associated with the database. If the database querying the benefit data sees that the expiry date for the benefit record has passed, then the database will replace the expired benefit record with its current benefit data. In one implementation, the expiry date provides a mechanism for a benefit record to be cleaned (or cleared) in the case that a given database crashes and cannot clean itself.

Even after all the databases on the machine know their relative need for memory, a method is required to distribute memory from the least needy database to the most needy database. In one implementation, two parameters are implemented (e.g., by a memory tuner) that control how much memory a database should be consuming—i.e., minfree and maxfree. The parameters minfree and maxfree can be hard coded values, and/or set by a user. In one implementation, minfree represents a target minimum amount of free physical RAM that should be available in the data processing system at any point in time, and maxfree represents a target maximum amount of free physical RAM that should be available in the data processing system at any point in time. In addition, another defined parameter curfree can be implemented to represent the current amount of free physical RAM remaining in the data processing system as reported by the operating system.

In one implementation, the database that has the largest overall benefit (and thus whose benefit data is stored in the shared memory benefit record), will acquire more memory from the operating system (step 408) in an attempt to reduce curfree down to the value of minfree. Other databases on the system that have a lower relative need (as determined above) will then try to maintain curfree as close to the value of maxfree as possible by freeing up memory that the database is currently consuming back to the operating system (step 410). That is, the memory allocated to each database is scaled to fall within the range of minfree and maxfree. In one implementation, the database with the most need for memory will try to go to minfree, databases that have less of a need for memory will scale themselves linearly within the range of minfree and maxfree, and databases that have zero benefit will try to restrict themselves to maxfree. In this way, databases with a lower relative benefit for memory passively transfer memory over to databases with a higher relative benefit for memory.

In one implementation, to keep performance overhead low, and to prevent constant oscillations of memory between databases, a tuning interval is chosen such that overall benefit data is only calculated once per interval, and querying (and possibly updating) the benefit record stored in shared memory is only performed once per interval, and the acquisition or freeing of memory by a database to meet the minfree/maxfree thresholds is only performed once per interval. Further, in one implementation, the amount of memory to be acquired or freed during one interval should be limited. For example, in one implementation, the database with the highest benefit for more memory may use an equation as follows to limit the amount of extra memory it will consume in one interval:

$$\text{MIN}((\text{curfree}-\text{minfree})*w, \text{database\_memory}*x) \quad \text{(e.q. 1)}$$

in which database_memory is the current amount of memory being used by a given database. (The variables "w" and "x" are defined below.) In addition, in one implementation, databases with a lower overall benefit for memory limit the amount of memory freed at each interval by using the following equation:

$$\text{MIN}((\text{maxfree}-\text{minfree})*y, \text{database\_memory}*z) \quad \text{(e.q. 2)}$$

In the equations above, (in one implementation) w and y lie in the range ($0.0 < w, y <= 1.0$) to ensure that the minfree and maxfree thresholds are respected, and x and z are positive ($0.0 < x, z$). The larger the values for w, x, y and z, the more memory will be transferred in each interval, however, the likelihood of oscillations increase. In one implementation, the amount of memory transferred by each database for an interval is set to be significantly smaller than the current amount of memory that database is currently consuming, as it is expected that any changes in memory consumption for a database will alter the overall benefit for that database for the next tuning interval, which may influence which databases then need to acquire or free more memory.

As discussed above, the memory benefit data of a given database can represent the overall benefit that a given database would achieve if the database were allowed to consume more memory. The overall benefit that a given database would achieve can be determined by calculating the individual benefit of each individual memory consumer in the given database (e.g., database 306A). A method for determining the efficiency benefit of among a plurality of individual memory consumers for a given database will now be described.

Figure 5:
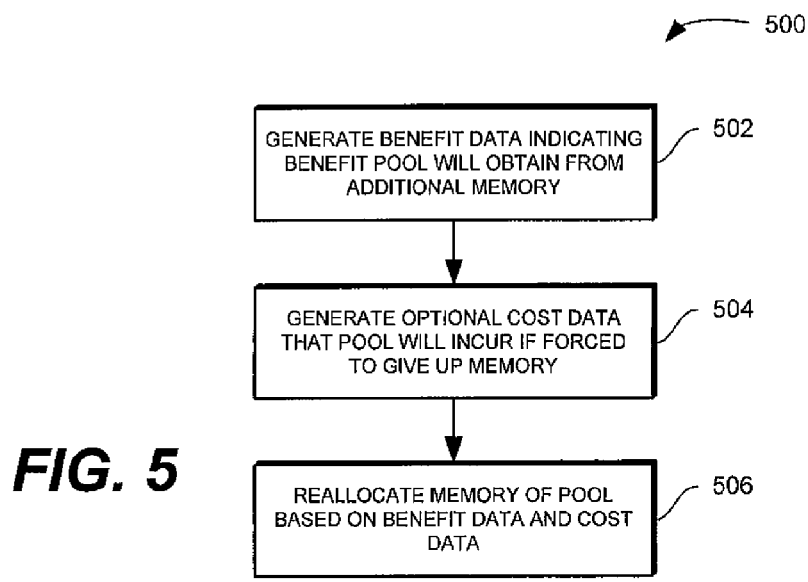
FIG. 5 illustrates a method for reallocating memory allocated to a buffer pool within a database in accordance with one implementation of the invention.

Referring to FIG. 5, a cost/benefit based method 500 for tuning memory in a database is provided. In one implementation, each memory pool (e.g., a buffer pool or other type of individual memory consumer in the database) generates a first statistic that indicates how much benefit the memory pool will gain from obtaining additional memory (step 502). Additionally, each memory pool generates a second statistic representing the cost that would be incurred if the memory pool were forced to give up memory (step 504). In one particular embodiment, the cost and benefit may be assumed to be equal (e.g., if the benefit is such that the addition of (10) pages will save (10) seconds, then the incurred cost can be assumed to be an extra (10) seconds if (10) pages are removed). A memory tuner (e.g., memory tuner 310A) then periodically examines the statistics for each memory pool and reallocates memory by removing memory from those memory pools with low cost and transfers the memory to memory pools with high benefit (step 506). In one implementation, this process continues iteratively until a satisfactory memory distribution is found.

Accordingly, a database memory tuner is provided that can assess the memory needs of each database memory pool (e.g., buffer pool) and then redistribute the database's memory to make optimal use of the system's resources. In one implementation, as long as a benefit calculation algorithm has been defined for a given memory pool, the algorithm can be plugged into the memory tuner so that the corresponding memory pool can have its memory appropriately tuned. In one implementation, the memory tuner works in an iterative process. In this implementation, in each iteration, the memory tuner first collects the cost/benefit information from each of the memory pools being tuned. In one implementation, the cost/benefit information is in the form of a common metric (e.g., additional saved system time per 4 K page of memory) so that the memory tuner need not know about the precise usage of memory for each buffer pool. In one implementation, use of a common cost/benefit based metric for all memory consumers (including memory consumers that may perform different functions) in a database provides a consistent manner by which memory is allocated among the memory consumers.

In one implementation, once the memory tuner has the required cost/benefit information, the memory tuner works to take memory from memory pools that have a low cost with respect to giving up memory, and provides memory to memory pools that will most benefit from additional memory. This can be done in a "greedy" fashion by taking memory from the consumer with the least cost and giving the memory to the consumer with the greatest benefit. In one implementation, the transferring of memory to/from a given memory pool is limited by some fixed amount per interval (e.g., 20% of a given memory pool's size at the beginning of the interval). In one implementation, the amount of memory transferred each interval is controlled by a predetermined criteria to stabilize the process of memory transfer among the memory pools. Accordingly, in one implementation, the memory tuner permits only memory pools that are above the database's mean benefit—i.e., the mean benefit value calculated across all consumers in a given interval—to grow in size during the given interval. Once no more memory can be transferred in the current interval, the memory tuner goes to sleep for some determined amount of time. When the memory tuner wakes, the process begins again with the collection of cost/benefit information from all of the memory pools. This iterative process continues until the database's memory configuration converges to a satisfactory state.

One or more of the method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 6:
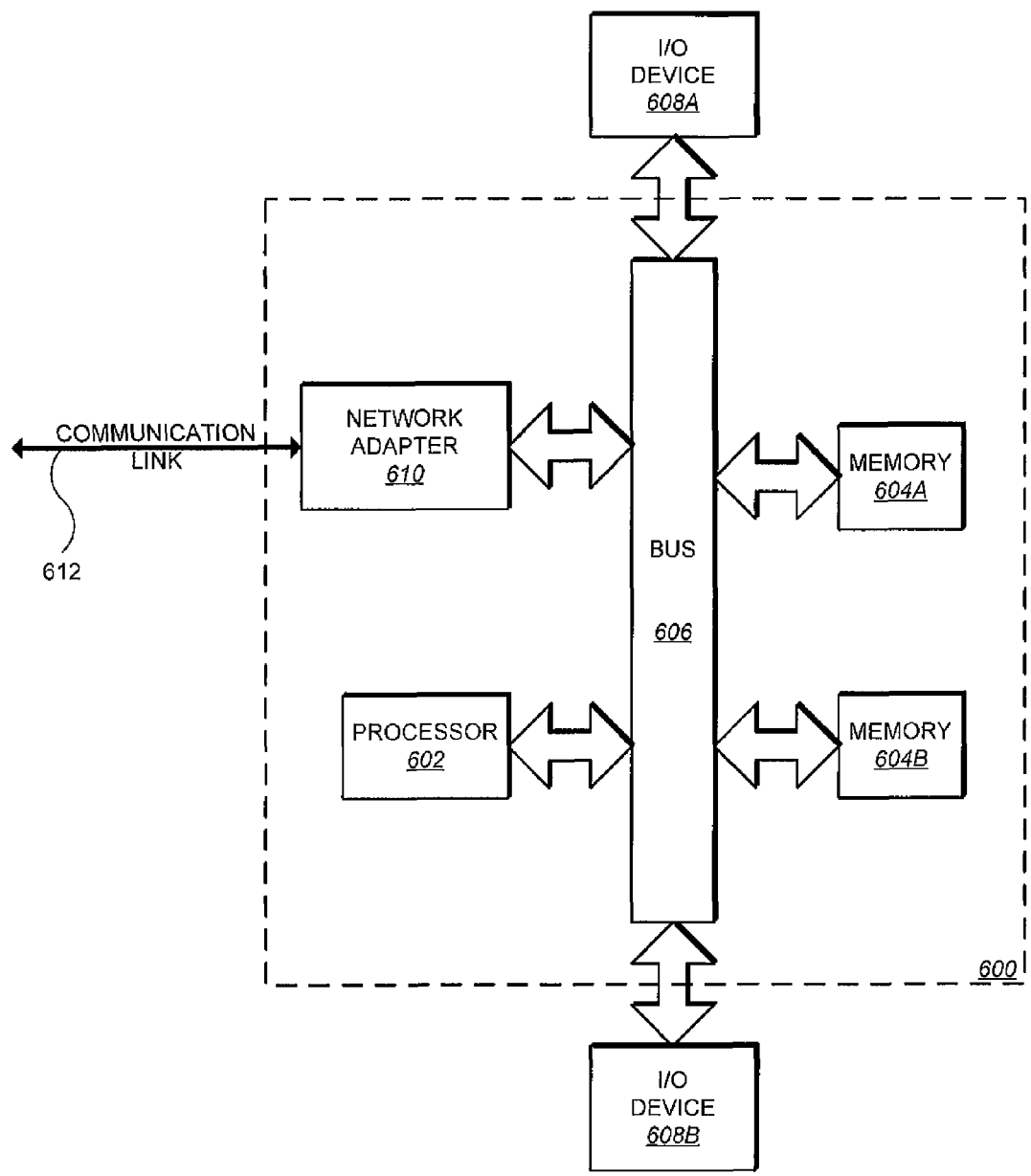
FIG. 6 is a block diagram of a data processing system suitable for storing and/or executing program code in accordance with one implementation of the invention.

FIG. 6 illustrates a data processing system 600 suitable for storing and/or executing program code. Data processing system 600 includes a processor 602 coupled to memory elements 604A-B through a system bus 606. In other embodiments, data processing system 600 may include more than one processor and each processor may be coupled directly or indirectly to one or more memory elements through a system bus.

Memory elements 604A-B can include local memory employed during actual execution of the program code, bulk storage, and cache memories that provide temporary storage of at least some program code in order to reduce the number of times the code must be retrieved from bulk storage during execution. As shown, input/output or I/O devices 608A-B (including, but not limited to, keyboards, displays, pointing devices, etc.) are coupled to data processing system 600. I/O devices 608A-B may be coupled to data processing system 600 directly or indirectly through intervening I/O controllers (not shown).

In the embodiment, a network adapter 610 is coupled to data processing system 600 to enable data processing system 600 to become coupled to other data processing systems or remote printers or storage devices through communication link 612. Communication link 612 can be a private or public network. Modems, cable modems, and Ethernet cards are just a few of the currently available types of network adapters.

Various implementations for dynamically re-configuring memory in a database system have been described. Nevertheless, one of ordinary skill in the art will readily recognize that various modifications may be made to the implementations, and any variation would be within the scope of the present invention. For example, the steps of methods discussed above can be performed in a different order to achieve desirable results. In addition, in one implementation, each memory consumer (e.g., a database as a whole, or an individual memory consumer within a database) can specify a minimum memory allocation that a corresponding memory tuner will not violate. That is, if a first memory consumer has a memory allocation that meets the minimum memory allocation and, for example, shows no cost, even if another memory consumer would benefit greatly from receiving additional memory, the memory tuner will not remove memory from the first memory consumer. The minimum memory allocation size for a given memory consumer can be calculated dynamically or set by a user. In similar manner, a maximum memory allocation can be specified for a given memory consumer.

Techniques for distributing memory according to the present invention were described above in substantial detail in respect of a particular implementation in which memory was dynamically reallocated among a plurality of databases, and within a single database. This detailed description was intended to be solely explanatory, and not limiting. As was noted above, a database is merely one example of an application which may run on a data processing system. Methods, systems, and computer program products according to the present invention can, now that the principles and techniques of the present invention have been clearly explained, be applied to other applications which may run on a data processing system. Examples of such other applications include, but are not limited to, suitable word processing applications, spreadsheet applications, e-mail applications, messaging applications, computer-assisted design applications, image processing applications, internet applications, telecommunication applications, video game applications, security applications, anti-virus applications, audio media applications, video media applications, document management applications, file management applications, mathematical processing applications, scheduling applications and operating systems used to coordinate the sharing of resources among other applications. For example, the techniques of the present invention may be used to distribute memory among a plurality of applications (such as those listed above) running on a data processing system, and/or to distribute memory among individual memory consumers for a single such application. One skilled in the computer arts, having been instructed in the novel techniques of the present invention, can make appropriate adaptations of those techniques so as to apply them to various situations and systems without departing from the scope of the present invention.

Furthermore, various modifications to implementations and the generic principles and features described herein may be made by those skilled in the art departing from the scope of the following claims. Thus, the present invention is not intended to be limited to the implementations shown but is to be accorded the widest scope consistent with the principles and features described herein.

What is claimed is:

1. A method for tuning memory allocated among a plurality of applications running on a common data processing system, wherein each application includes a plurality of individual memory consumers, the method comprising:
    generating benefit data for the individual memory consumers of each of the plurality of applications on the common data processing system, wherein the benefit data for each individual memory consumer indicates a benefit gained by that individual memory consumer obtaining additional memory;
    generating overall memory benefit data for each application by mathematically combining the generated benefit data for the individual memory consumers of that application, wherein the overall memory benefit data for each application indicates a benefit gained by that application obtaining additional memory;
    comparing the generated overall memory benefit data associated with each of the plurality of applications to determine memory needs of the applications;
    determining memory allocated among the plurality of applications to reallocate and dynamically reallocating the memory from one or more of the plurality of applications with a lesser memory need to one or more other of the plurality of applications with a greater memory need based on the comparison of overall memory benefit data; and
    re-distributing memory allocated to one or more of the applications among the individual memory consumers of those applications based on consumer benefit data for each individual memory consumer indicating a benefit gained by that individual memory consumer obtaining additional memory.

2. The method of claim 1, wherein the overall memory benefit data represents time saved that a given application would achieve if the application were allocated additional memory.

3. The method of claim 2, wherein the overall memory benefit data is represented as time saved per unit of memory.

4. The method of claim 3, wherein the time saved is one of system time saved, program execution time saved, response time saved, and disk time saved.

5. The method of claim 1, wherein generating overall memory benefit data for each application includes:
    generating a first statistic that indicates how much benefit the application would gain from obtaining additional memory; and
    generating a second statistic representing a cost that would be incurred if the application were forced to give up memory.

6. The method of claim 1, wherein comparing the generated overall memory benefit data associated with each of the plurality of applications includes:
    storing, in a shared memory, a single record including overall memory benefit data indicating the overall benefit for an application having a highest benefit; and
    comparing the respective overall memory benefit data for each application with the overall memory benefit data stored in the shared memory.

7. The method of claim 1, wherein dynamically reallocating memory from one or more of the plurality of applications with the lesser memory need to one or more other of the plurality of applications with the greater memory need includes distributing memory from a least needy application to a most needy application.

8. The method of claim 1,
    wherein dynamically reallocating memory from one or more of the plurality of applications with the lesser memory need to one or more other of the plurality of applications with the greater memory need prevents reallocation of memory away from those applications with insufficient memory to meet a minimum memory allocation in response to the reallocation.

9. The method of claim 7, wherein distributing memory from a least needy application to a most needy application includes the most needy application acquiring additional memory according to the following equation:

$$MIN((curfree-minfree)*w, application\_memory*x),$$

and the least needy application freeing up memory according to the following equation:

$$MIN((maxfree-minfree)*y, application\_memory*z)$$

where application_memory represents a current amount of memory being used by the most needy application, maxfree represents a target maximum amount of free physical memory for the data processing system, minfree represents a target minimum amount of free physical memory available for the data processing system, curfree represents a current amount of free physical memory in the data processing system, w and y lie in the range ($0.0 < w, y <= 1.0$), and x and z are positive ($0.0 < x, z$).

10. The method of claim 7, wherein each of the plurality of applications comprises one of a database application, word processing application, spreadsheet application, e-mail application, messaging application, computer-assisted design application, image processing application, internet application, telecommunication application, video game application, security application, anti-virus application, audio media application, video media application, document management application, file management application, mathematical processing application, scheduling application, and an operating system used to coordinate the sharing of resources among other applications.

11. A computer program product, tangibly stored on a computer-readable memory device, for tuning memory allocated among a plurality of applications in a common data processing system, wherein each application includes a plurality of individual memory consumers, the product comprising instructions to cause a programmable processor to:
    generate benefit data for the individual memory consumers of each of the plurality of applications on the common data processing system, wherein the benefit data for each individual memory consumer indicates a benefit gained by that individual memory consumer obtaining additional memory;

generate overall memory benefit data for each application by mathematically combining the generated benefit data for the individual memory consumers of that application, wherein the overall memory benefit data for each application indicates a benefit gained by that application obtaining additional memory;

compare the generated overall memory benefit data associated with each of the plurality of applications to determine memory needs of the applications;

determine memory allocated among the plurality of applications to reallocate and dynamically reallocate the memory from one or more of the plurality of applications with a lesser memory need to one or more other of the plurality of applications with a greater memory need based on the comparison of overall memory benefit data; and re-distribute memory allocated to one or more of the applications among the individual memory consumers of those applications based on consumer benefit data for each individual memory consumer indicating a benefit gained by that individual memory consumer obtaining additional memory.

12. The product of claim 11, wherein the overall memory benefit data represents time saved that a given application would achieve if the application were allocated additional memory.

13. The product of claim 12, wherein the overall memory benefit data is represented as time saved per unit of memory.

14. The product of claim 13, wherein the time saved is one of system time saved, program execution time saved, response time saved, and disk time saved.

15. The product of claim 11, wherein the instructions to generate overall memory benefit data for each application include instructions to:

generate a first statistic that indicates how much benefit the application would gain from obtaining additional memory; and generate a second statistic representing a cost that would be incurred if the application were forced to give up memory.

16. The product of claim 11, wherein the instructions to compare the generated overall memory benefit data associated with each of the plurality of applications include instructions to:

store, in a shared memory, a single record including overall memory benefit data indicating the overall benefit for an application having a highest benefit; and compare respective overall memory benefit data of each application with the memory benefit data stored in the shared memory.

17. The product of claim 11, wherein the instructions to dynamically reallocate memory from one or more of the plurality of applications with the lesser memory need to one or more other of the plurality of applications with the greater memory need include instructions to distribute memory from a least needy application to a most needy application.

18. The product of claim 11, further comprising instructions to cause a programmable processor to prevent reallocation of memory away from those applications with insufficient memory to meet a minimum memory allocation in response to the reallocation.

19. The product of claim 17, wherein the instructions to distribute memory from a least needy application to a most needy application include instructions for the most needy application to acquire additional memory according to the following equation:

$$MIN((curfree-minfree)*w, application\_memory*x),$$

and instructions for the least needy application to free up memory according to the following equation:

$$MIN((maxfree-minfree)*y, application\_memory*z)$$

where application_memory represents a current amount of memory being used by the most needy application, maxfree represents a target maximum amount of free physical memory for the data processing system, minfree represents a target minimum amount of free physical memory for the data processing system, curfree represents a current amount of free physical memory in the data processing system, w and y lie in the range ($0.0<w, y<=1.0$), and x and z are positive ($0.0<x,z$).

20. The product of claim 17, wherein each of the plurality of applications comprises one of a database application, word processing application, spreadsheet application, e-mail application, messaging application, computer-assisted design application, image processing application, internet application, telecommunication application, video game application, security application, anti-virus application, audio media application, video media application, document management application, file management application, mathematical processing application, scheduling application, and an operating system used to coordinate the sharing of resources among other applications.

21. A data processing system for running a plurality of applications, wherein each application includes a plurality of individual memory consumers, the data processing system comprising a processor with a memory tuner operable to:

generate benefit data for the individual memory consumers of each of the plurality of applications on the data processing system, wherein the benefit data for each individual memory consumer indicates a benefit gained by that individual memory consumer obtaining additional memory;

generate overall memory benefit data for each application by mathematically combining the generated benefit data for the individual memory consumers of that application, wherein the overall memory benefit data for each application indicates a benefit gained by that application obtaining additional memory;

compare the generated overall memory benefit data associated with each of the plurality of applications to determine memory needs of the applications;

determine memory allocated among the plurality of applications to reallocate and dynamically reallocate the memory from one or more of the plurality of applications with a lesser memory need to one or more other of the plurality of applications with a greater memory need based on the comparison of overall memory benefit data; and re-distribute memory allocated to one or more of the applications among the individual memory consumers of those applications based on consumer benefit data for each individual memory consumer indicating a benefit gained by that individual memory consumer obtaining additional memory.

22. The data processing system of claim 21, wherein the overall memory benefit data represents time saved that a given application would achieve if the application were allocated additional memory.

23. The data processing system of claim 22, wherein the overall memory benefit data is represented as time saved per unit of memory.

24. The data processing system of claim 23, wherein the time saved is one of system time saved, program execution time saved, response time saved, and disk time saved.

25. The data processing system of claim 21, wherein the memory tuner is operable to generate overall memory benefit data for each application including:
generating a first statistic that indicates how much benefit the application would gain from obtaining additional memory; and
generating a second statistic representing a cost that would be incurred if the application were forced to give up memory.

26. The data processing system of claim 21, further comprising:
a shared memory configured to store a single record including overall memory benefit data indicating the overall benefit for an application having a highest benefit,
wherein the memory tuner is operable to compare the generated overall memory benefit data associated with each of the plurality of applications including comparing the respective overall memory benefit data of each application with the overall memory benefit data stored in the shared memory.

27. The data processing system of claim 21, wherein the memory tuner is operable to dynamically reallocate memory from one or more of the plurality of applications with the lesser memory need to one or more other of the plurality of applications with the greater memory need by distributing memory from a least needy application to a most needy application.

28. The data processing system of claim 21, wherein the memory tuner is further operable to prevent reallocation of memory away from those applications with insufficient memory to meet a minimum memory allocation in response to the reallocation.

29. The data processing system of claim 27, wherein the memory tuner is operable to distribute memory from a least needy application to a most needy application including the most needy application acquiring additional memory according to the following equation:

MIN((curfree-minfree)*w,application_memory*x), and the least needy application freeing up memory according to the following equation:

MIN((maxfree-minfree)*y,application_memory*z)

where application_memory represents a current amount of memory being used by the most needy application, maxfree represents a target maximum amount of free physical memory for the data processing system, minfree represents a target minimum amount of free physical memory for the data processing system, curfree represents a current amount of free physical memory in the data processing system, w and y lie in the range (0.0<w, y<=1.0), and x and z are positive (0.0<x,z).

30. The data processing system of claim 27, wherein the data processing system is capable of running one or more of a database application, word processing application, spreadsheet application, e-mail application, messaging application, computer-assisted design application, image processing application, internet application, telecommunication application, video game application, security application, anti-virus application, audio media application, video media application, document management application, file management application, mathematical processing application, scheduling application, and an operating system used to coordinate the sharing of resources among other applications.

31. A method for tuning memory allocated among a plurality of individual memory consumers for a corresponding one of a plurality of applications running on a common data processing system, the method comprising:
allocating memory to each of the plurality of applications running on the common data processing system based on overall benefit data for each application, wherein the overall benefit data for each application indicates a benefit gained by that application obtaining additional memory and is generated from benefit data for the plurality of individual memory consumers for that application by mathematically combining the benefit data for the individual memory consumers;
generating memory benefit data for each of the plurality of individual memory consumers of the corresponding application, including generating a first statistic representing a benefit the individual memory consumer would gain from obtaining an additional amount of the memory allocated to that corresponding application and generating a second statistic representing a cost that would be incurred if the individual memory consumer were forced to give up memory;
comparing the generated memory benefit data associated with each of the plurality of individual memory consumers for the corresponding application; and
determining memory allocated among the memory consumers for the corresponding application to reallocate and dynamically reallocating the memory from one or more of the plurality of individual memory consumers for the corresponding application to one or more other of the plurality of individual memory consumers for the corresponding application based on the comparison of memory benefit data.

32. The method of claim 31, wherein comparing the generated memory benefit data associated with each of the plurality of individual memory consumers includes:
storing, in a shared memory, a single record including memory benefit data indicating the overall benefit for an individual memory consumer for the corresponding application having a highest benefit; and
comparing the respective memory benefit data for each individual memory consumer for the corresponding application with the memory benefit data stored in the shared memory.

33. The method of claim 31, wherein dynamically reallocating memory from one or more of the plurality of individual memory consumers for the corresponding application to one or more other of the plurality of individual memory consumers for the corresponding application includes distributing memory from a least needy individual memory consumer to a most needy individual memory consumer.

34. The method of claim 31,
wherein dynamically reallocating memory from one or more of the plurality of individual memory consumers for the corresponding application to one or more other of the plurality of individual memory consumers for the corresponding application prevents reallocation of memory away from those individual memory consumers with insufficient memory to meet a minimum memory allocation in response to the reallocation.

35. The method of claim 31, wherein:
the corresponding application comprises a database application; and each individual memory consumer for the database application comprises one of a memory for a buffer pool, a memory for a shared sort space, a memory for a private sort space, a memory for a database row lock, a memory for a table lock, and a memory for a package cache.

36. A computer program product, tangibly stored on a computer-readable memory device, for tuning memory allocated among a plurality of individual memory consumers for a corresponding one of a plurality of applications running on a common data processing system, the product comprising instructions to cause a programmable processor to:
  allocate memory to each of the plurality of applications running on the common data processing system based on overall benefit data for each application, wherein the overall benefit data for each application indicates a benefit gained by that application obtaining additional memory and is generated from benefit data for the plurality of individual memory consumers for that application by mathematically combining the benefit data for the individual memory consumers;
  generate memory benefit data for each of the plurality of individual memory consumers of the corresponding application, including generating a first statistic representing a benefit the individual memory consumer would gain from obtaining an additional amount of the memory allocated to that corresponding application and generating a second statistic representing a cost that would be incurred if the individual memory consumer were forced to give up memory;
  compare the generated memory benefit data associated with each of the plurality of individual memory consumers for the corresponding application; and
  determine memory allocated among the memory consumers for the corresponding application to reallocate and dynamically reallocate the memory from one or more of the plurality of individual memory consumers for the corresponding application to one or more other of the plurality of individual memory consumers for the corresponding application based on the comparison of memory benefit data.

37. The product of claim 36, wherein the instructions to compare the generated memory benefit data associated with each of the plurality of individual memory consumers include instructions to:
  store, in a shared memory, a single record including memory benefit data indicating the overall benefit for an individual memory consumer for the corresponding application having a highest benefit; and
  compare respective memory benefit data of each individual memory consumer for the corresponding application with the memory benefit data stored in the shared memory.

38. The product of claim 36, wherein the instructions to dynamically reallocate memory from one or more of the plurality of individual memory consumers for the corresponding application to one or more other of the plurality of individual memory consumers for the corresponding application include instructions to distribute memory from a least needy individual memory consumer to a most needy individual memory consumer.

39. The product of claim 36, further comprising instructions operable to cause a programmable processor to prevent reallocation of memory away from those individual memory consumers with insufficient memory to meet a minimum memory allocation in response to the reallocation.

40. The product of claim 36, wherein:
  the corresponding application comprises a database application; and
  each individual memory consumer for the database application comprises one of a memory for a buffer pool, a memory for a shared sort space, a memory for a private sort space, a memory for a database row lock, a memory for a table lock, and a memory for a package cache.

41. A data processing system running a plurality of applications each having a plurality of associated individual memory consumers, the data processing system comprising a processor operable to:
  allocate memory to each of the plurality of applications running on the data processing system based on overall benefit data for each application, wherein the overall benefit data for each application indicates a benefit gained by that application obtaining additional memory and is generated from benefit data for the plurality of individual memory consumers for that application by mathematically combining the benefit data for the individual memory consumers;
  generate memory benefit data for each of the plurality of individual memory consumers for a corresponding one of the plurality of applications on the data processing system, including generating a first statistic representing a benefit the individual memory consumer would gain from obtaining an additional amount of the memory allocated to that corresponding application and generating a second statistic representing a cost that would be incurred if the individual memory consumer were forced to give up memory;
  compare the generated memory benefit data associated with each of the plurality of individual memory consumers for the corresponding application; and
  determine memory allocated among the memory consumers for the corresponding application to reallocate and dynamically reallocate the memory from one or more of the plurality of individual memory consumers for the corresponding application to one or more other of the plurality of individual memory consumers for the corresponding application based on the comparison of memory benefit data.

42. The data processing system of claim 41, further comprising:
  a shared memory configured to store a single record including memory benefit data indicating the overall benefit for an individual memory consumer for the corresponding application having a highest benefit,
  wherein the processor is operable to compare the generated memory benefit data associated with each of the plurality of individual memory consumers for the corresponding application including comparing the respective memory benefit data of each individual memory consumer for the corresponding application with the memory benefit data stored in the shared memory.

43. The data processing system of claim 41, wherein the processor is operable to dynamically reallocate memory from one or more of the plurality of individual memory consumers for the corresponding application to one or more other of the plurality of individual memory consumers for the corresponding application by distributing memory from a least needy individual memory consumer to a most needy individual memory consumer.

44. The data processing system of claim 41, wherein the processor is further operable to prevent reallocation of memory away from those individual memory consumers with insufficient memory to meet a minimum memory allocation in response to the reallocation.

45. The data processing system of claim 41, wherein:

the corresponding application comprises a database application; and each individual memory consumer for the database application comprises one of a memory for a buffer pool, a memory for a shared sort space, a memory for a private sort space, a memory for a database row lock, a memory for a table lock, and a memory for a package cache.

* * * * *